(12) United States Patent
Frosini et al.

(10) Patent No.: US 6,398,485 B1
(45) Date of Patent: Jun. 4, 2002

(54) DEVICE FOR POSITIONING OF NOZZLES OF A STATOR STAGE AND FOR COOLING OF ROTOR DISCS IN GAS TURBINES

(75) Inventors: Franco Frosini, Fiorentino; Piero Jacopetti, Uzzano, both of (IT)

(73) Assignee: Nuovo Pignone Holding S.p.A., Florence (IT)

( * ) Notice: Subject to any disclaimer, the term of this patent is extended or adjusted under 35 U.S.C. 154(b) by 0 days.

(21) Appl. No.: 09/579,520

(22) Filed: May 26, 2000

(30) Foreign Application Priority Data

May 31, 1999 (IT) .......................................... MI99A1208

(51) Int. Cl.[7] ................................................. F01D 9/06
(52) U.S. Cl. ...................... 415/115; 415/116; 415/136; 415/137; 415/173.7; 415/174.4; 415/189; 415/209.2; 415/209.4
(58) Field of Search ................................. 415/115, 116, 415/117, 136, 137, 138, 189, 190, 173.7, 174.4, 209.2, 209.3, 209.4

(56) References Cited

U.S. PATENT DOCUMENTS

| | | | | |
|---|---|---|---|---|
| 3,275,294 A | * | 9/1966 | Allen et al. .................. | 415/137 |
| 3,728,041 A | * | 4/1973 | Bertelson .................. | 415/209.2 |
| 4,668,162 A | * | 5/1987 | Cederwall et al. ........... | 415/115 |
| 4,804,310 A | * | 2/1989 | Fuller et al. ................ | 415/115 |
| 4,883,405 A | * | 11/1989 | Walker ........................ | 415/137 |
| 4,936,745 A | * | 6/1990 | Vine et al. ................ | 415/174.4 |
| 5,779,436 A | * | 7/1998 | Glezer et al. ................ | 415/115 |
| 5,967,746 A | * | 10/1999 | Hagi et al. ................ | 415/174.4 |
| 5,997,245 A | * | 12/1999 | Tomita et al. ............... | 415/115 |
| 6,077,034 A | * | 6/2000 | Tomita et al. ............... | 415/115 |
| 6,217,279 B1 | * | 4/2001 | Ai et al. ...................... | 415/115 |

FOREIGN PATENT DOCUMENTS

| | | | | |
|---|---|---|---|---|
| CA | 610668 A | * | 12/1960 | ............... 415/209.2 |
| DE | 1403024 A | * | 11/1968 | .................. 415/189 |

* cited by examiner

Primary Examiner—Christopher Verdier
(74) Attorney, Agent, or Firm—Nixon & Vanderhye

(57) ABSTRACT

A device for positioning of nozzles of a stator stage and for cooling of rotor discs in gas turbines, of the type including nozzle segments consisting of several airfoils. Each nozzle segment is connected at its top to an outer ring to define a chamber containing cooling air and is positioned at its base on an inner ring. The nozzle segments form a circumferential array about the axis of the gas turbine. In each airfoil of the nozzle segment, there is provided at least one tube, which is inserted in a corresponding duct inside the airfoil for delivering cooling air to the first and second stage discs.

13 Claims, 2 Drawing Sheets

Figure 1:
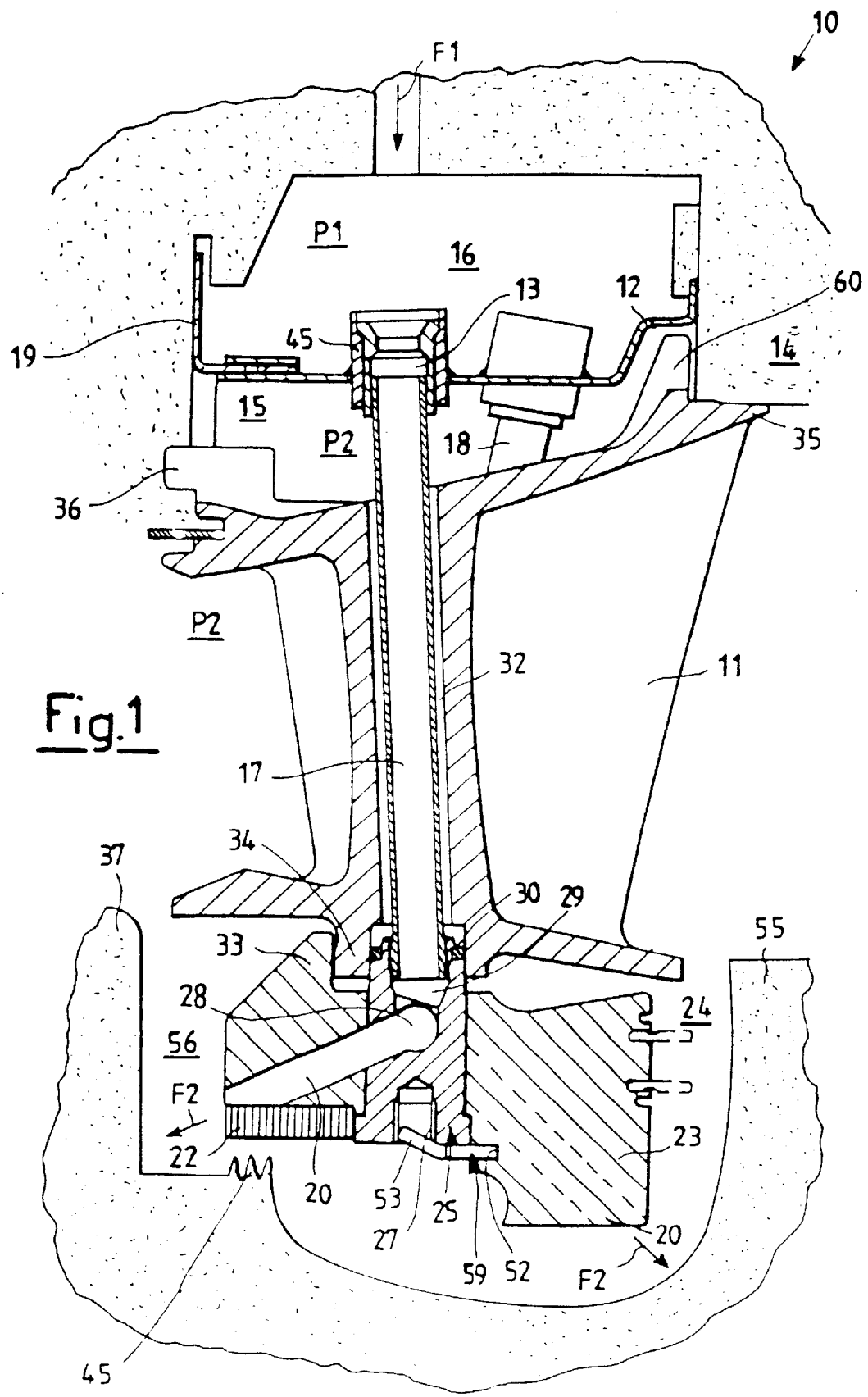

DEVICE FOR POSITIONING OF NOZZLES OF A STATOR STAGE AND FOR COOLING OF ROTOR DISCS IN GAS TURBINES

The present invention relates to a device for positioning of nozzles of a stator stage and for cooling of rotor discs in gas turbines.

As is known, gas turbines are machines which consist of a compressor and of a turbine with one or more stages, wherein these components are connected to one another by a rotary shaft, and wherein a combustion chamber is provided between the compressor and the turbine.

In order to pressurise the compressor, it is supplied with air obtained from the outer environment.

There is admission into the combustion chamber of the fuel, which is ignited by means of corresponding spark plugs, in order to produce the combustion, which is designed to give rise to an increase in the temperature and pressure, and thus to enthalpy of the gas.

Subsequently, via corresponding ducts, the high-temperature, high-pressure gas reaches the various stages of the turbine, which transforms the enthalpy of the gas into mechanical energy which is available to a user.

In two-stage turbines, the gas is processed in the first stage of the turbine, in temperature and pressure conditions which are quite high, and undergoes initial expansion there; whereas in the second stage of the turbine it undergoes second expansion, in temperature and pressure conditions which are lower than in the previous cases.

It is also known that in order to obtain the best performance from a specific gas turbine, the temperature of the gas needs to be as high as possible; however, the maximum temperature values which can be obtained in use of the turbine are limited by the resistance of the materials used.

In order to make apparent the technical problems solved by the present invention, a brief description is provided hereinafter of the system of stator nozzles and rotor blades of the various stages of a gas turbine according to the known art.

The first stage nozzle is used to supply the flow of burnt gases in suitable conditions to the intake of the first stage rotor, and, in particular, to guide it in an appropriate manner into the apertures of the rotor blades; thus preventing the flow from meeting directly the dorsal or convex surface and the ventral or concave surface of the blades.

The series of nozzles for the second stage of a gas turbine consists of an annular body, which in turn can be divided into nozzle segments, each segment generally consisting of nozzles which are defined or formed by three foils, which have a corresponding wing-shaped profile.

This series of nozzles for the second stage is in the shape of a ring, and is connected on the exterior to the turbine housing, and on the interior to a corresponding annular support.

In this respect, it should be noted that a first technical problem of the stators consists of the fact that the stator is subjected to high pressure loads, which are caused by the reduction of pressure between the intake and output of the nozzle.

In addition, the stators are subjected to high temperature levels, caused by the flow of hot gases obtained from the combustion chamber and from the preceding stage, as well as by the flows of cold air which are introduced inside the turbine, in order to cool the parts which are subjected to the greatest stress from the thermal and mechanical points of view.

A second problem which is particularly common according to the known art is that of guaranteeing optimum support and locking of the segments of the second stage nozzle, which counterbalances the forces which tend to displace and rotate the nozzle.

In addition, the conventional stators have support and locking systems which do not permit easy dismantling, if this is necessary in order to carry out operations of maintenance or replacement of one or more worn or damaged stator foils.

Another problem consists of the fact that the stators are subject to the vibrations transmitted by the stator vanes during functioning of the machine.

The object of the present invention is thus to provide a device for positioning of nozzles of a stator stage, and for cooling of rotor discs in gas turbines, which is particularly reliable, in order to eliminate the aforementioned problems in an optimum manner.

Another object of the invention is to provide a device for positioning of nozzles of a stator stage, and for cooling of rotor discs in gas turbines, which has a simple and compact structure.

Another object of the invention is to provide a device which has a low cost, and consists of a reduced number of component parts.

Yet another object of the invention is to provide a device for positioning of nozzles of a stator stage in gas turbines which permits easy fitting and dismantling of the stator vanes, as required, in order to maintain and optionally to replace the latter.

A further object of the invention is to provide a device which permits optimum resistance to the vibrations which affect the low-pressure stator vanes, thus preventing these vibrations from being transferred to the other elements of the motor.

A further object of the invention is to provide a device which makes it possible to compensate for the thermal expansion to which the segments of the nozzle are subject.

Another object of the invention is to provide a device which is safe, simple and economical.

This and other objects are achieved by a device for positioning of nozzles of a stator stage and for cooling of rotor discs in gas turbines, which is applicable to nozzle segments consisting of several foils, wherein each of the said nozzle segments is connected at the top to an outer ring to contain cooling air, and is positioned at the base on an inner ring, which makes it possible to arrange the said nozzle segments circumferentially relative to the axis of the said gas turbine, characterised in that, for each foil of the said nozzle segment, there is provided at least one tube, which is inserted in a corresponding duct present inside the said foils, which puts an area where the said cooling air circulates into communication with the high pressure disc and the low pressure disc.

According to a preferred embodiment of the present invention, the outer ring to contain the cooling air is associated with a mobile ring, which makes it possible to compensate for the differential thermal expansion which arises between the turbine housing and the outer ring.

According to another preferred embodiment of the present invention, the inner ring has receptacles for pins, wherein these pins are used for positioning of the nozzle segments.

According to a further preferred embodiment of the present invention, corresponding sealing rings are provided between the pins and the lower end of the foils of the nozzle segment.

In addition, the right- and left-hand pins are mounted such as to have radial play which is greater than the play relating to the central pin.

According to another preferred embodiment of the present invention, the inner ring has ducts which communicate respectively with the tubes and with the first stage disc and the second stage disc.

In addition, the pins have holes in order to permit communication by the cooling air between the tubes and the ducts of the inner ring.

Finally, according to the present invention, extraction of the pins from the inner ring is prevented by means of use of corresponding segments, which are inserted in a circumferential groove in the inner ring, and are shaped such as to have projections, which are folded inside holes present on the lower part of the said pins.

Finally, the inner ring has on its interior a honeycomb which is interfaced with the sealing teeth on the rotor, belonging to the high pressure stage.

Further characteristics of the invention are defined in the claims attached to the present patent application.

Figure 2:
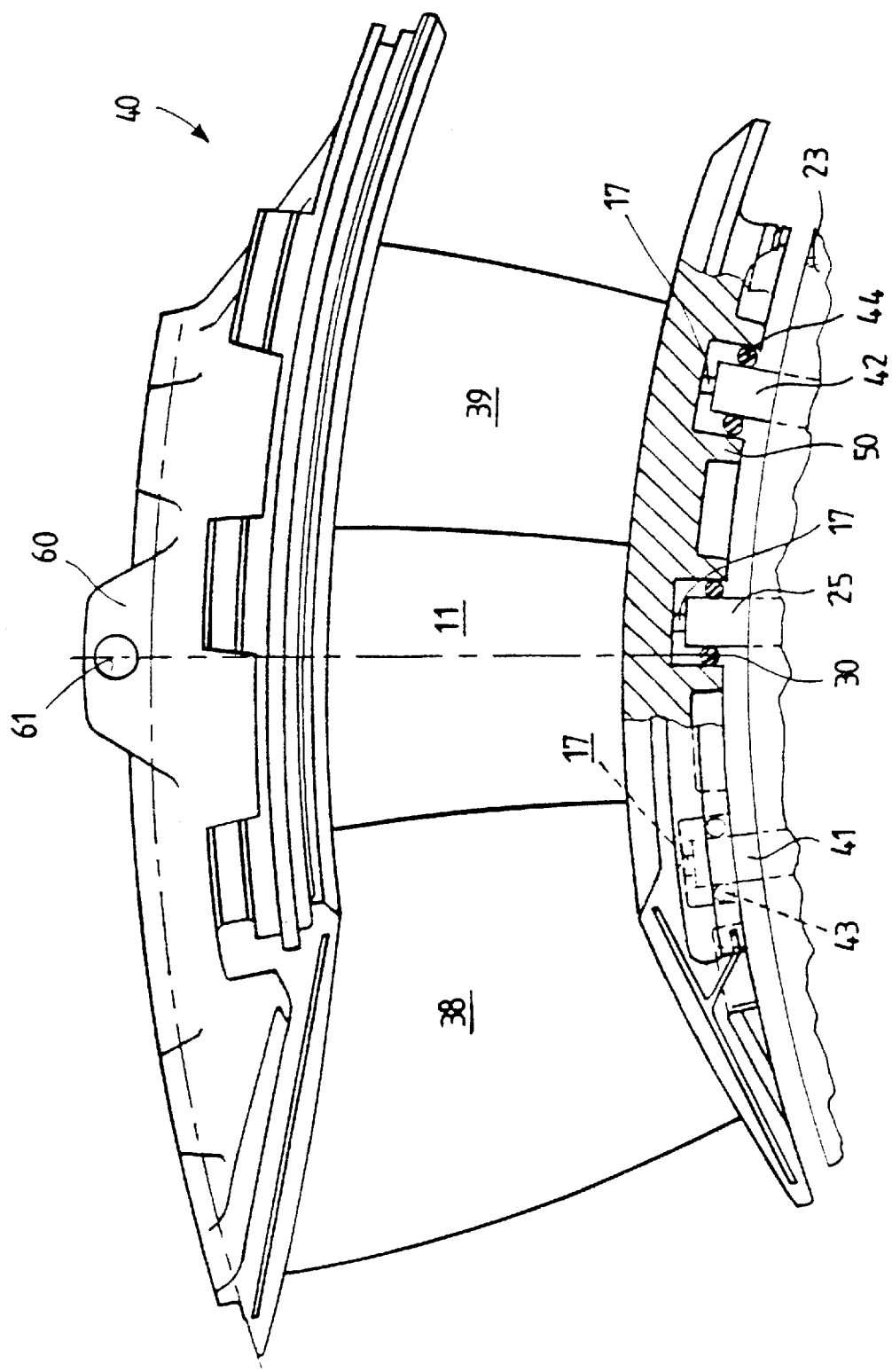

Further objects and advantages of the present invention will become apparent from examination of the following description and the attached drawings, provided purely by way of non-limiting example, and in which:

FIG. 1 shows a view in cross-section of the central portion of a segment of stator foils of a second stage nozzle for gas turbines, to which the device for positioning and cooling according to the present invention is fitted; and FIG. 2 shows a view partially in cross-section of a segment of stator foils belonging to a stator nozzle, and which illustrates the positioning system as a whole.

With particular reference to the aforementioned Figures, the device for positioning and cooling for nozzles of a stator stage in gas turbines is indicated as a whole by the reference number 10.

As is known, the series of nozzles for the second stage of a gas turbine consists of an annular body, which in turn can be divided into nozzle segments, indicated as a whole by the reference number 40 in FIG. 2.

According to a possible embodiment of the present invention, which is described by way of illustrative example, but does not limit its use, the annular body has sixteen nozzle segments; however, it is possible to apply the teaching of the present patent description also to annular bodies which have a different number of nozzle segments.

Each segment consists of nozzles which are defined or determined by three foils 11, 38 and 39, which have an appropriate wing-shape profile.

Each nozzle segment 40 is connected to the turbine housing 14 by means of a slot 60, which contains a hole for a pin 61.

Each nozzle segment 40 is connected at the top to an outer ring 12, which acts as a container for the cooling air, and is positioned at the base on an inner ring 23, which makes it possible to arrange the nozzle segments 40 circumferentially relative to the axis of the gas turbine.

In addition, each of the nozzle segments 40 has a projection 36, which engages with a corresponding groove in the turbine housing 14, and an edge 35 which engages with the opposite side of the turbine housing 14.

Between the inner ring 23 and the first stage disc 37 and second stage disc 55 of the gas turbine, spaces are provided, which are indicated respectively by the numerical references 56 and 24 in FIG. 1, which permit circulation of cooling air.

This cooling air is taken from the space 16, in which it at a pressure P1, and is conveyed in the direction indicated by the arrows F1 and F2, into the spaces 56 and 24, by means of tubes 17 and 18 inserted in corresponding ducts, such as the duct 32 shown in FIG. 1, which are present inside the foils 11, 38 and 39, and will be described in detail hereinafter.

It should be noted, inter alia, that the outer ring 12 makes it possible to isolate the space 16 from the space 15 of the nozzle segment 40, and thus to supply to all the tubes of all the foils 11, 38 and 39 which belong to all the segments 40, by means of a reduced number of cooling air conduction holes provided in the turbine housing 14.

At the nozzle segments 40, the gases are at a temperature which is higher than the temperature of the air in the space 16, and therefore the outer ring 12 also makes it possible to limit undesirable heating of the air present in the space 16.

With reference to FIG. 1, the right-hand end of the outer ring 12 is sealed in contact with the surface of the turbine housing 14, such as to guarantee this sealing.

In addition, in order to take into account these temperature differences, the outer ring 12 to contain the cooling air is associated with a mobile ring 19, which makes it possible to compensate for the differential thermal expansions between the turbine housing 14 and the outer ring 12 itself.

The tubes 17 and 18 therefore put the area 16 where the cooling air circulates into communication with the high pressure disc 37 and the low pressure disc 55.

With reference to FIG. 1, it can be seen that in order to improve this cooling air circulation system, the outer ring 12 has annular container bodies 45 which cooperate with bushes 13, to accommodate the ends of the tube 17, on the side on which the turbine housing 14 is disposed.

In addition, at the opposite end of the nozzle segments 40, the inner ring 23 has receptacles for pins 25, 41 and 42, which permit positioning of the nozzle segments 40.

More particularly, with reference to FIG. 1 alone, the pin 25 accommodates the final end of the tube 17, inside a cavity 29 of its own.

A similar system is used to accommodate the final end of the tubes associated with the foils 38 and 39, by means of corresponding pins 41 and 42.

In this respect, it can be noted that sealing rings 30, 43 and 44 are provided between the pins 25, 41 and 42, and the lower ends 33, 49 and 50 of the foils 11, 38 and 39.

With reference to FIG. 1, it can be seen that the inner ring 23 has a circumferential projection 33, which abuts an end portion 34 of the nozzle segment 40, interposed between the latter and the pin 25.

An important characteristic of the present invention consists of the fact that the right-hand 41 and left-hand 42 sealing pins are mounted with greater radial play than the central pin 25.

This fact is particularly important since it makes it possible to compensate for the expansion of the nozzle segment 40 relative to the inner ring 23.

As far as conveying of cooling air is concerned, it can be seen that the inner ring 23 has a duct 20 which communicates with the tube 17; a similar duct communicates with the tube 18, all such that the cooling air reaches respectively the first stage disc 37 and the second stage disc 55.

In this respect, the pin 25 has a hole 28 in order to permit communication of the tube 17 with the duct 20.

A similar system is used in order to permit communication of cooling air by the other tubes, which are associated with the foils 38 and 39.

Extraction of the pins 25 from the inner ring 23 is prevented by segments 59, which are inserted in a circumferential groove 52 in the inner ring 23.

The segments 59 are shaped such as to have projections 53, which are folded inside holes 27 present at the base of the pin 25.

Finally, the inner ring 23 has a honeycomb 22, which is interfaced with the sealing teeth 45 on the rotor 37 of the high pressure stage.

During functioning of the gas turbine, the flow of high-temperature gas is intercepted by the nozzle segments 40, and conveyed by the latter to the second stage rotor blades.

However, the cooling air which is present in the space 16 has its temperature isolated from the hotter gases, and is conveyed by means of the tubes and the pins beneath in the ducts, which bring it into contact with the high-pressure disc 37 and the low-pressure disc 55.

Thermal expansion of the nozzle segments 40 is compensated for by the increased play with which the lateral pins are fitted.

The description provided makes apparent the characteristics and advantages of the device for positioning and cooling for nozzles of a stator stage in gas turbines, which is the subject of the present invention.

It will be appreciated that many variants can be provided for the device for positioning and cooling for nozzles of a stator stage in gas turbines, which is the subject of the present invention, without departing from the principles of novelty inherent in the inventive concept.

Finally, it will be appreciated that any materials, shapes and dimensions of the details illustrated can be used as required in the practical embodiment of the invention, and can be replaced by others which are technically equivalent.

What is claimed is:

1. A stator stage for cooling high and low pressure rotor discs of a gas turbine, comprising:

a turbine housing;

an annular array of nozzle segments carried by said turbine housing, each said nozzle segment including a plurality of airfoils;

an outer ring carried by said housing adjacent an outer margin of each nozzle segment and defining with said housing a chamber for containing cooling air;

an inner ring carried by said housing, said nozzle segments being disposed between said outer ring and said inner ring;

at least one airfoil of each nozzle segment having a passage in communication between said chamber and a location adjacent said high and low pressure discs for supplying cooling air from said chamber to said location to cool said discs;

said outer ring having an additional mobile ring movable to compensate for differential thermal expansion between said housing and said outer ring.

2. A stator stage according to claim 1 wherein each of said airfoils of said segment has a passage in communication with said chamber and said location.

3. A stator stage according to claim 2 wherein said passages include tubes, said outer ring having annular container bodies and bushings for accommodating outer ends of said tubes.

4. A stator stage according to claim 3 wherein each said nozzle segment has a projection which engages with a corresponding groove in said turbine housing and an edge which engages an opposite side of said turbine housing.

5. A stator stage according to claim 3 wherein said inner ring has receptacles and pins received in said receptacles for positioning said nozzle segments relative to said housing.

6. A stator stage according to claim 5 wherein said pins receive inner ends of said tubes, the pins having cavities for receiving the inner tube ends.

7. A stator stage according to claim 5 including sealing rings between said pins and the inner ends of said airfoils.

8. A stator stage according to claim 7 including three circumferentially spaced pins per nozzle segment wherein the end pins on each segment having radial play greater than the radial play for the central pin between said end pins.

9. A stator stage according to claim 7 wherein said inner ring has a circumferential projection abutting an end portion of the nozzle segment interposed between said projection and a pin.

10. A stator stage according to claim 3 wherein said inner ring has ducts which communicate, respectively, with the tubes and with said high pressure disc and said low-pressure disc.

11. A stator stage according to claim 10 including pins have a plurality of holes enabling communication of the tubes with said ducts.

12. A stator stage according to claim 7 including projections for preventing extraction of said pins from said inner ring, said projections being inserted into a circumferential groove in the inner ring.

13. A stator stage according to claim 7 wherein said inner ring includes a honeycomb, and sealing teeth carried by said high-pressure disc and in registration with said honeycomb.

* * * * *

UNITED STATES PATENT AND TRADEMARK OFFICE
CERTIFICATE OF CORRECTION

PATENT NO. : 6,398,485 B1
DATED : June 4, 2002
INVENTOR(S) : Frosini et al.

It is certified that error appears in the above-identified patent and that said Letters Patent is hereby corrected as shown below:

<u>Column 6,</u>
Line 36, delete "have a plurality" and insert -- having a plurality -- therefor.

Signed and Sealed this

Fifteenth Day of April, 2003

JAMES E. ROGAN
*Director of the United States Patent and Trademark Office*